US00RE34467E

United States Patent [19]

Reeves

[11] E Patent Number: Re. 34,467

[45] Reissued Date of Patent: Dec. 7, 1993

[54] TUBULAR CONNECTION

[75] Inventor: Doyle E. Reeves, Houston, Tex.

[73] Assignee: The Hydril Company, Houston, Tex.

[21] Appl. No.: 869,812

[22] Filed: Apr. 16, 1992

Related U.S. Patent Documents

Reissue of:

[64] Patent No.: 4,917,409
Issued: Apr. 17, 1990
Appl. No.: 240,679
Filed: Sep. 6, 1988

U.S. Applications:

[63] Continuation of Ser. No. 868,887, May 27, 1986, abandoned, which is a continuation of Ser. No. 489,739, Apr. 29, 1983, abandoned.

[51] Int. Cl.[5] ..... F16L 15/00

[52] U.S. Cl. ..... 285/334; 285/390

[58] Field of Search ..... 285/333, 334, 355, 390, 285/332.2

[56] References Cited

U.S. PATENT DOCUMENTS

| | | | |
|---|---|---|---|
| Re. 30,647 | 6/1987 | Blose | 285/334 |
| 412,446 | 10/1889 | Allen . | |
| 671,274 | 4/1901 | Fischer . | |
| 1,474,375 | 11/1923 | Moore . | |
| 1,932,427 | 10/1933 | Stone | 285/146 |
| 2,006,520 | 7/1935 | Stone et al. | 285/146 |
| 2,051,499 | 8/1936 | Siegle | 285/146 |
| 2,062,407 | 12/1936 | Eaton | 285/146 |
| 2,140,467 | 12/1938 | Cargile | 285/146 |
| 2,177,100 | 10/1939 | Frame | 285/146 |
| 2,183,644 | 12/1939 | Frame | 10/101 |
| 2,196,966 | 4/1940 | Hammer | 285/46 |
| 2,206,223 | 7/1940 | Deearborn | 287/130 |
| 2,207,005 | 7/1940 | Haas | 287/125 |
| 2,239,942 | 4/1941 | Stone et al. | 285/334 |
| 2,258,066 | 10/1941 | Oyen . | |
| 2,267,923 | 12/1941 | Johnson | 285/146 |
| 2,532,632 | 12/1950 | MacArthur | 285/146 |
| 2,543,100 | 2/1951 | Engh | 74/459 |
| 2,772,102 | 11/1956 | Webb | 285/334 |
| 2,893,759 | 7/1959 | Blose | 285/334 |
| 2,992,019 | 7/1961 | MacArthur | 285/110 |
| 3,047,316 | 7/1962 | Wehring et al. | 285/334 |
| 3,079,181 | 2/1963 | VanDer Wissel | 285/333 |
| 3,109,672 | 11/1963 | Franz | 285/334 |
| 3,158,390 | 11/1964 | Woodling | 285/334 |
| 3,224,799 | 12/1965 | Blose et al. | 285/334 |
| 3,346,278 | 10/1967 | Yocum | 285/333 |
| 3,359,013 | 12/1967 | Knox et al. | 285/13 |
| 3,467,413 | 9/1969 | Madrelle | 285/332.2 |
| 3,468,563 | 9/1969 | Duret | 285/93 |
| 3,489,437 | 1/1970 | Duret | 285/55 |
| 3,497,246 | 2/1970 | Weiner | 285/333 |
| 3,508,771 | 4/1970 | Duret | 285/334 |
| 3,572,777 | 3/1971 | Blose et al. | 285/334 |
| 3,574,373 | 4/1971 | LeDerf et al. | 287/117 |
| 3,989,284 | 11/1976 | Blose | 285/334 |
| 3,994,516 | 11/1976 | Fredd | 285/39 |
| 4,040,756 | 8/1977 | Donegan | 403/307 |
| 4,113,290 | 9/1978 | Milda | 285/334 |
| 4,161,332 | 7/1979 | Blose | 285/334 |
| 4,192,533 | 3/1980 | Blose | 285/334 |
| 4,244,607 | 1/1981 | Blose | 285/92 |
| 4,373,754 | 2/1983 | Bollfrass et al. | 285/334 |
| 4,410,204 | 10/1983 | Reimert | 285/24 |
| 4,423,893 | 1/1984 | Holmes | 285/334 |
| 4,508,375 | 4/1985 | Patterson et al. | 285/334 |
| 4,550,937 | 11/1985 | Duret | 285/334 |
| 4,600,224 | 7/1986 | Blose | 285/334 |
| 4,600,225 | 7/1986 | Blose | 285/334 |
| 4,822,081 | 4/1989 | Blose | 285/334 |

FOREIGN PATENT DOCUMENTS

| | | |
|---|---|---|
| 568114 | 12/1932 | Fed. Rep. of Germany . |
| 1132173 | 11/1986 | Fed. Rep. of Germany . |
| 1042192 | 10/1953 | France . |
| 226987 | 8/1943 | Switzerland . |
| 137777 | 1/1920 | United Kingdom . |
| 786652 | 11/1957 | United Kingdom . |

*Primary Examiner*—Eric K. Nicholson
*Attorney, Agent, or Firm*—Vaden, Eickenroht, Thompson, Boulware & Feather

[57] ABSTRACT

An improved threaded connection adapted to secure adjacent conduits in a continuous flow conduit forming relationship. The threaded connection employs a tapered or wedge shaped thread with angled or tapered thread load flanks to obtain superior mechanical strength by controlling stress levels in the connection. To insure proper make-up of the connection the dimension of the thread structure is controlled to prevent trapping of thread lubricant during rotational make-up which may produce false torque make-up values.

13 Claims, 3 Drawing Sheets

FIG.1
(PRIOR ART)
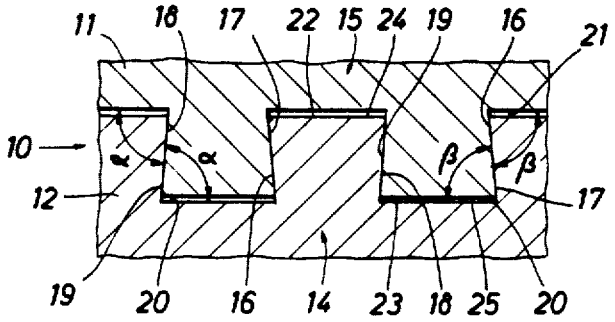
FIG.2
(PRIOR ART)
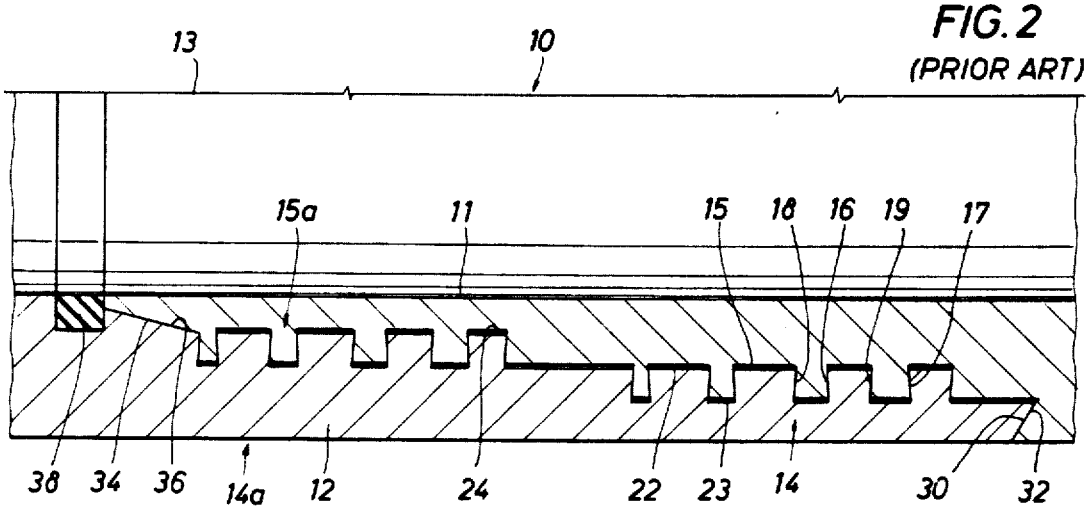
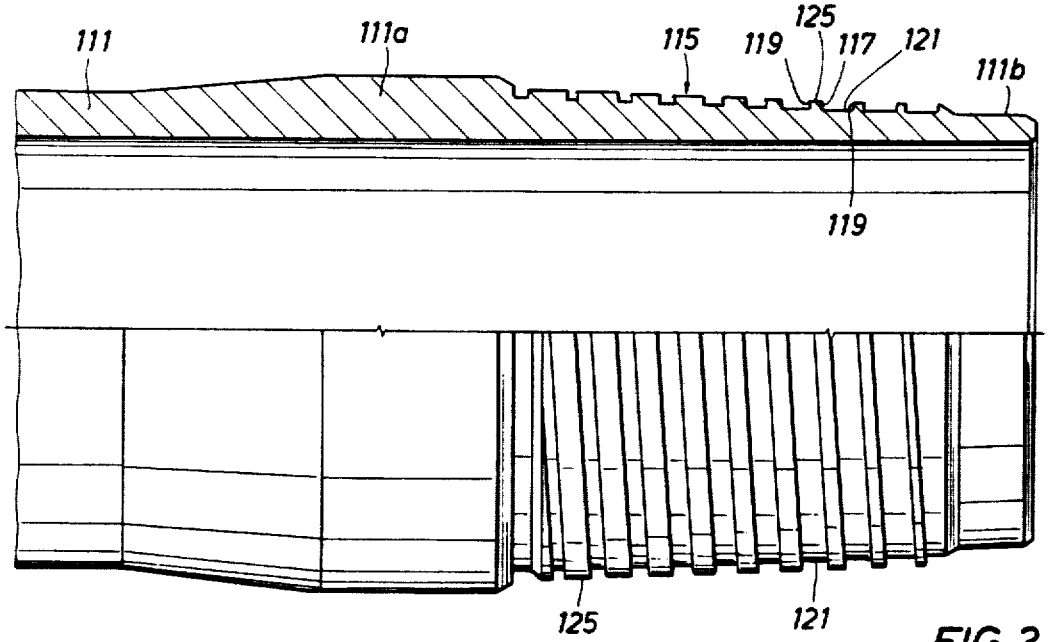
FIG.3

TUBULAR CONNECTION

Matter enclosed in heavy brackets [ ] appears in the original patent but forms no part of this reissue specification; matter printed in italics indicates the additions made by reissue.

BACKGROUND OF THE INVENTION

1. Technical Field

The present invention, which is a continuation of application Ser. No. 868,887, filed May 27, 1986, entitled "IMPROVED TUBULAR CONNECTION", which is a continuation of Ser. No. 489,739, filed Apr. 29, 1983, *both* now abandoned, entitled "TUBULAR CONNECTION", relates generally to the field of tubular connections and more specifically to the field of threaded connections for securing flow conduits to form a desired continuous flow path.

2. Background Art

The use of threaded connections for joining flow conduits in an end-to-end relationship to form a continuous flow path or channel for transporting fluid under pressure is well known. The use of threaded connections in the production of hydrocarbons and other forms of energy from subsurface earth formations is particularly well known. Drill pipe, well casing and production tubing, commonly known collectively as oilfield tubular goods, all utilize threaded connections for connecting adjacent conduit sections or pipe joints. Examples of such threaded end connections for use on oilfield tubular goods are disclosed in Stone et al. Pat. No. 2,239,942; MacArthur Pat. No. 2,992,019; and Knox et al. Pat. No. 3,359,013, which were all assigned to the assignee of the present invention.

In Blose Pat. No. RE. 30,647, also assigned to the assignee of the present invention, there is disclosed a tubular connection having a unique thread form or structure that provides an unusually strong connection while controlling the stress and strain in the connected pin and box members within acceptable levels. The mating helical threads are tapered in thread width in opposite directions to provide a substantially simultaneous wedge-like engagement of the opposing flanks to limit rotational make-up of the connection. The value of the thread width as well as the value of the flank shoulder angles are two of the variables that may be used to control the stress and strain induced in the pin and box for a given make-up torque.

When making up a threaded connection manufactured in accordance with the disclosure of the Blose reissue patent, liquid and paste-like thread lubricants have been temporarily trapped in the helical clearance between the roots and crests of the threads. The trapped fluid may, under certain circumstances, give a false indication that the connection is properly made up. Thereafter, the temporarily trapped thread lubricant or thread dope can bleed off through the helical clearance between the roots and crests reducing the preload stress and strain so that the anticipated performance level or strength of the threaded connection may not be achieved. While such reduction in the performance level is not properly attributable to a deficiency in the connection or its design, the consequence of improper make-up is an unacceptable performance level for the threaded connection.

SUMMARY OF THE INVENTION

The present invention relates to an improvement for a thread structure to increase the probability or likelihood of proper make-up of the threaded connection. When properly made up a thread structure having a tapered thread width and one or more dove-tail flanks exhibits superior mechanical strength. By tailoring the thread structure to a particular application or use, the threaded connection is limited only by the properties of the materials of construction used in making the connection. To achieve such a level of performance it is necessary to forceably make-up the connection to a predetermined torque value to insure that the design stress and strain preload conditions actually exist in the connection.

Frequently, oilfield tubular goods must be assembled or made up under extremely adverse conditions. In addition, the threaded connections may experience deterioration or damage in handling and transportation to the well site where they are to be used. In addition to these general factors, the particular thread structure disclosed in Blose Pat. No. RE. 30,647 has exhibited some tendency to trap liquid or paste-like thread lubricants in the radial clearance areas between the thread roots and crests and prevent the desired normal force to be developed between the thread flanks even though the proper torque is applied to the connection. Unless the connection is properly tightened to a described level, the performance of the threaded connection will be significantly reduced. While the lubricant can and will be extruded from the trapping areas if the torque is maintained on the connection for a sufficient period of time, the personnel running or installing the oilfield conduits cannot be certain that torquing had been properly accomplished.

The present invention reduces the volume of trapped thread lubricant and locates most of the trapped lubricant in the helical space between the load flanks that has a very small axial thickness and little or no effect on the proper make-up of the connection or the ability of the thread surfaces to form seals as they move together.

BRIEF DESCRIPTION OF THE DRAWINGS

FIG. 1 is a side view, in section, of the prior art thread structure;

FIG. 2 is a side view, in section, of a prior art connection having the prior art thread structure;

FIG. 3 is a side view, partially in section, of a pin member having the thread structure of the present invention formed thereon;

BRIEF DESCRIPTION OF THE PREFERRED EMBODIMENT

Figure 6:
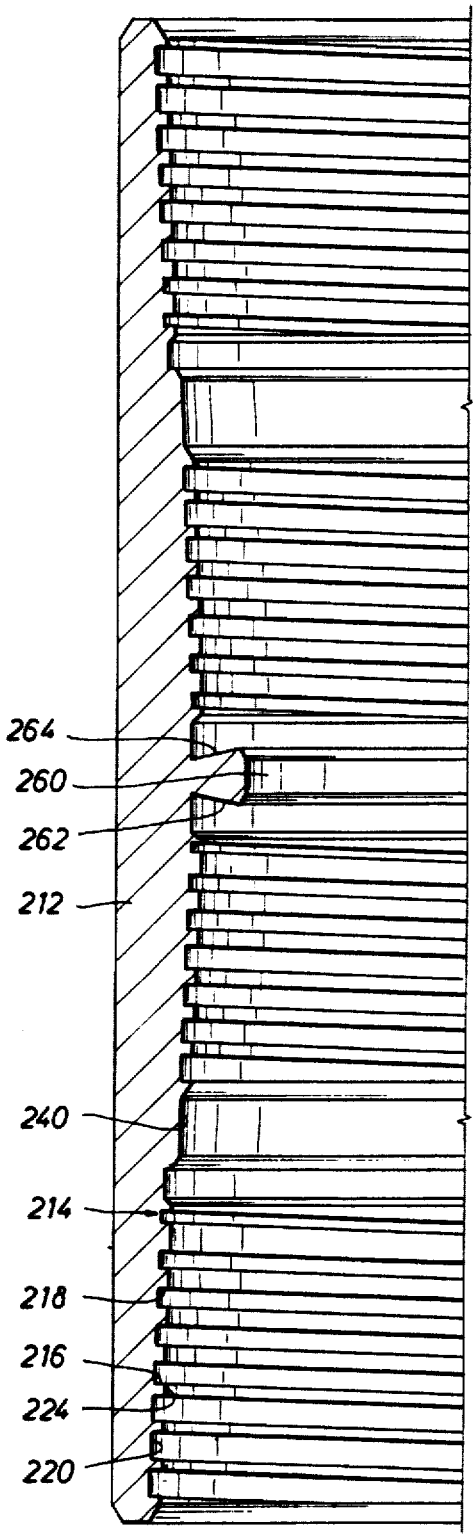
FIG. 6 is a partial side view, in section, of a coupling having another form of the thread structure of the present invention formed internally thereon.

The prior art FIGS. (Nos. 1 and 2), correspond to FIGS. 2 and 6, respectively of Blose U.S. Pat. No. RE.

30,647. That patent, along with all of the other patents mentioned or identified herein are incorporated by reference as if actually set forth herein. However, for background purposes in understanding the present invention a brief description of the Blose prior art construction is set forth hereinbelow.

The Blose threaded connection or pipe joint, generally designated 10, includes a first or pin member 11 and a second or box member 12, respectively, with either one or both of the members defining the longitudinal axis 13 of the made-up connection 10. As illustrated in FIG. 2, the box member 12 has an internal thread structure 14 formed thereon adapted to engage a complementary external thread structure 15 formed on the pin 11 for mechanically securing in a releasable manner the members 11 and 12. Helical threads 14 and 15 have a dove-tail interfit so that a first load flank wall 16 of the thread 14 engages with complementary load flank wall 17 formed on the thread 15. The opposite or stab flank wall 18 formed by the thread structure 14 engages the complementary stab flank wall 19 formed by the thread structure 15. As used herein, and as conventionally understood where pipe joints are being connected in a vertical position, such as when making up a pipe string for lowering into a well bore, the term "load flank" designates that side wall surface of a thread that faces away from the outer end of the respective male or female member on which the thread is formed, and the term "stab flank" designates that side wall surface that faces toward the outer end of the respective male or female member and supports the weight of the joint during the initial make up of the joint.

An angle $\alpha$ is formed between the flank wall 18 and the root wall 20 of the thread 14. Likewise, the angle $\alpha$ is also formed between the stab flank wall 19 and the root wall 21 of the thread structure 15. The flank wall 16 and the root wall 20 as well as the flank wall 17 and the root wall 21 of the thread 15 form a second angle $\beta$. The angles $\alpha$ and $\beta$ are preferably acute angles to provide dovetail shaped threads. However, it should be understood that a semi-dove-tail form can be provided where one of the angles $\alpha$ and $\beta$ can be ninety (90) degrees which would flank wall perpendicular or normal to the longitudinal axis 13 of the connection. In the disclosure of the Blose reissue Pat. No. 30,647, clearances 22 and 23 are provided between the root walls 20 and 21 and the thread crests 24 and 25 of the threads 14 and 15, respectively in the hand tight position so that relatively wide helical spaces containing thread lubricant are present throughout the length of the threads. As will be noted in FIG. 2, the helical thread 14 formed on the first or box member 12 has a greater thread width between the flanks 16 and 18 at the thread tip or crest 24 than at the base of the thread; likewise, helical thread 15 has a greater axial distance between flanks 17 and 19 at the thread crest 25 than at the base of the thread. Further, each thread 14 and 15 has a progressively reducing thread width in opposite directions along the helical length thereof to provide a tapered wedge thread arranged such that flanks 16 and 18 of thread 14 engage load flanks 17 and 19 of thread 15 at substantially the same time when the threads are made up hand tight. Prior to that time, there is a gap between at least one of the flanks of threads 14 and 15. In the embodiment illustrated from the Blose reissue patent, the maximum thread width of the tapered thread is no greater than twice the thread width at the narrowest point for a corresponding location on a flank.

The connection 10 illustrated in FIG. 2 is provided with a multiple or two step cylindrical thread having a stop shoulder 30 formed on the pin member 11 that engages a corresponding stop shoulder 32 on the box 12. Because the engaging flanks of threads 14 and 15 also serve as a make-up stop shoulder, it may be desired to provide a clearance gap between the shoulders 30 and 32. The connection 10 is also provided with the conventional conical metal-to-metal seal zone on the pin 11 at 34. A companion sealing surface 36 formed on the box 12 engages the pin sealing surface 34 to block passage of fluid therebetween. In the illustrated embodiment of FIG. 2 a plastic seal ring 38 such as disclosed in U.S. Pat. No. 3,100,656 to MacArthur, may be employed. Such plastic ring 38 is preferably used with internally lined pipe for providing a continuous corrosion-resistant surface.

In the embodiment illustrated in FIG. 2, the threads are formed at a common radial distance or radius from the longitudinal axis 13 of the joint to provide a cylindrical rather than a tapered thread. The thread structures 14 and 15 are formed on a larger radius while the second step threads, referenced as 14a and 15a, are formed on a small radius or distance from the longitudinal axis 13 of the connection 10. The two step thread, which may be cylindrical or tapered, is recognized for its speed of assembly during installation operations as is known in the art.

Figure 7:
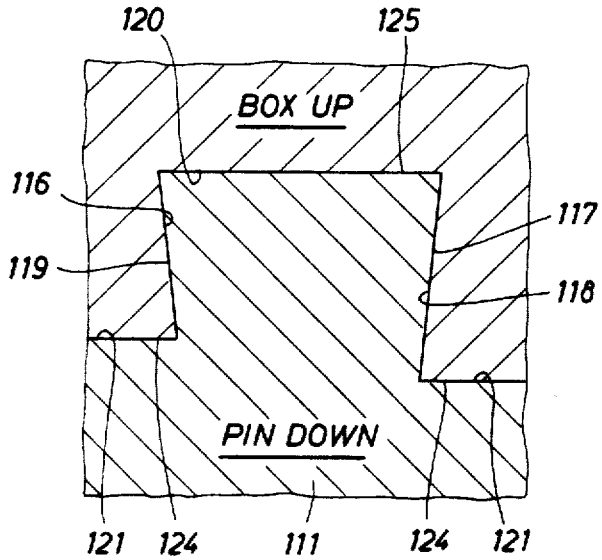
FIG. 7 is a cross-sectional view on an enlarged scale of a pin and box having the dove-tail shaped threads used with the preferrerd embodiment of the invention.

In the embodiment of the present invention illustrated in FIG. 3 and in FIG. 7 like reference characters, increased by 100, have been used to designate like parts to simplify and shorten the written description. A pin member 111 is provided with external helical thread structure 115 on upset end portion 111a of pin 111. It is to be understood however that the thread structure of the present invention is equally well suited for non-upset or plain end pipe. The tapered wedge-like thread structure 115 also has one or both of its flank 117 and 119 inclined outwardly at an acute angle so as to provide a generally dove-tail shape. The thread root 121 separates the oppositely facing flank shoulders 117 and 119 which are disposed adjacent thereto. The thread crests 125 are disposed at the outer ends of the flanks 117 and 119 and alternate with the thread roots 121 in the conventional manner. The thread width between the oppositely facing flank surfaces 117 and 119 below the thread crests 125 varies progressively at a uniform rate substantially the entire helical length of the thread 115. This provides a tapered wedge thread design in which the flanks 117 and 119 engage the corresponding fanks on the threads of the female member at substantially the same time upon rotational make-up of the threaded connection. In viewing the lower portion of FIG. 3 it will be immediately appreciated that the axial thread width decreases or varies progressively at a much greater rate from that illustrated in the embodiment of FIG. 2. In particular, it has been found desirable to increase the axial thread width at the widest portion in the range of approximately four times the thread width at the narrowest portion. This contrasts with the embodiment illustrated in FIG. 2 where the thread width at the widest portion is only twice the thread width at the narrowest portion. The pin member 111 may be provided with an identical or different thread structure on the other end (not illustrated) in the conventional manner.

In the present invention, the thread roots 121 and the thread crests 125 on the pin are dimensioned to eliminate the formation of the radial clearance illustrated at 22 and 23 in FIG. 1 and FIG. 2. In other words, thread roots 121 and thread crests 125 come into interference contact with the corresponding surfaces of the box, i.e., when the joint is made up hand tight. By eliminating the radial clearance between the thread roots 120 and 121 and crests 124 and 125 with the complementary thread structure, the possibility of creating chambers therebetween upon hand tight connection make-up that can virtually entrap the liquid or paste-like thread lubricant theein and create high squeeze film pressures which produce false torque readings is greatly minimized if nsot entirely reduced. In order to achieve this result the roots 120 and 121 and crests 124 and 125 of the threads are dimensioned to be in contact with each other upon hand tight make up and may, if desired to be dimensioned to provide a radial interference for inducing a controlled stress in the pin member 111 upon forceable make-up.

The pin member 111 may also be provided with the conventional metal-to-metal seal area 111*b* for blocking leakage of fluid between the pin 111 and the box member when the connection is made up in the usual manner.

Figure 4:
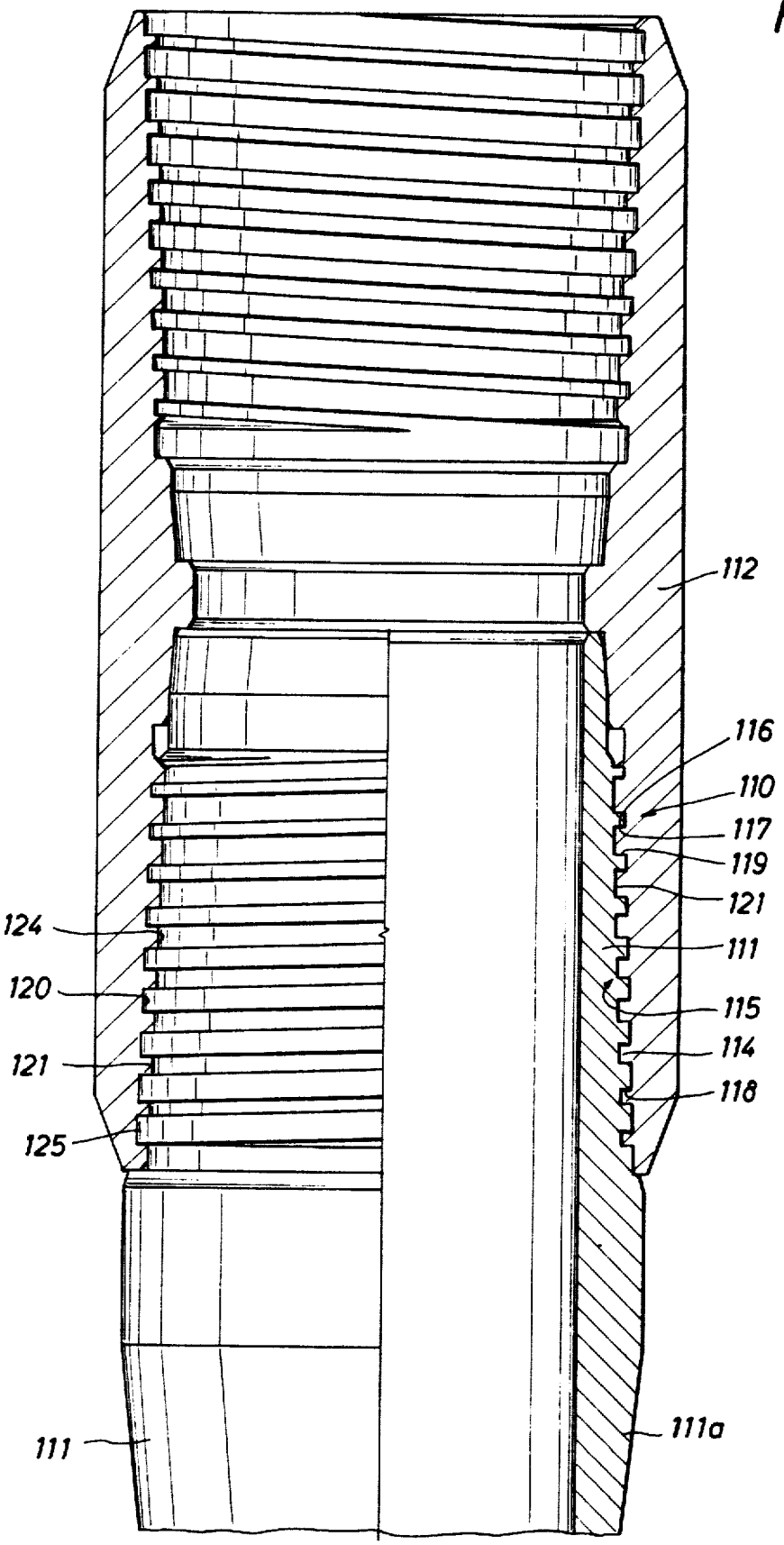
FIG. 4 is a side view, partially in section, of a threaded and coupled connection of the present invention.

FIG. 4 illustrates the pin 111 of FIG. 3 made up in a box member or coupling 112 to form a thread and coupled (T & C) connection 110. The coupling 112 is provided with the internal or box complementary thread structure 114 for making up with the pin in the usual manner. When assembled in the manner illustrated the thread roots 120 and 121 coact with the thread crests 124 and 125 to prevent formation of undesired radial clearance that may traps thread lubricant during assembly in the manner described above.

The upper portion of the coupling 112 is illustrated with an identical thread structure facing in the opposite direction for connecting with a tube, pipe or conduit disposed adjacent to and above the coupling 112 in the usual manner. If desired a different thread structure may be provided in the upper portion of the coupling 112 without departing from the scope of the present invention.

Figure 5:
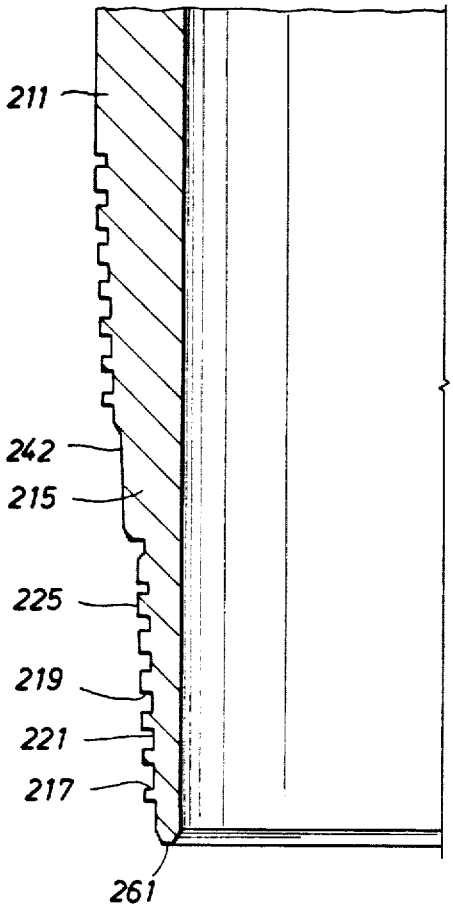
FIG. 5 is a side view, in section, of a tubular conduit having an external pin thread structure of the present invention formed thereon.

In the embodiment of FIGS. 5 and 6, a two step conical or tapered (i.e., varying thread diameter) thread construction is illustrated rather than a cylindrical two step thread such as disclosed in FIG. 2. The pin 211 has an external helical thread structure 215 formed in accordance with the present invention while the coupling 212 is provided with two internal helical thread structures 214 facing in opposite directions for coupling with adjacent tubes in the conventional manner. In FIG. 6 it is again to be understood that a different thread profile or structure may be provided at one end of the coupling or box member 212. Disposed substantially equi-distant from the outer ends of the coupling 212 is an inwardly projecting collar 260 forming a downwardly facing annular shoulder 262 and an upwardly facing shoulder 264. Because the tapered or wedge configuration of the threads 214 and 215 provide stop shoulders to limit rotational make-up of the coupling 212 on the pin 211, the end surface 261 of pin 211 is not brought in contact with the downwardly facing shoulder 262 of the flange 260. However, the flange 260 serves to provide a substantially turbulent-free flow path to minimize the effects of flow erosion on the coupling 212.

The sealing area 240 of the coupling 212 is located intermediate of the two steps of tapered threads. The sealing area 240 of the coupling engages the seal area 242 formed on the pin 211 intermediate the two spaced thread steps to form an additional metal-to-metal seal to block leakage of fluid between the coupling 212 and the pin 211 in a conventional manner. While an intermediate seal is illustrated it should be understood that other seal locations and types of seal are equally well suited for use with the present invention.

The foregoing disclosure and description of the invention are illustrative and explanatory thereof, and various changes in the size, shape and materials, as well as in the details of the illustrated construction, may be made without departing from the spirit of the invention.

What is claimed is:

1. A threaded pipe connection comprising a box having tapered, internal, generally dovetail-shaped threads with stab flanks and load flanks and flat roots and crests that are parallel to the longitudinal axis of the pipe and a pin having tapered, [exterani] *external,* generally dovetail-shaped threads with stab flanks and load flanks and flat roots and crests that are parallel to the longitudinal axis of the pipe for mating with the internal threads of the box to make up a pipe connection, a pipe thread lubricant coating the threads, said threads increasing in width in one direction on the box and in the other direction on the pin so the roots, crests, and flanks of the threads move together and form seals that resist the flow of fluids between the threads with [the stab flanks and] the roots and crests being designed to move into [sealing] engagement before both the load flanks and the stab flanks move into [sealing] engagement [after which the flanks will move together and form seals] to complete the sealing of the connection as the connection is fully made up.

2. A threaded pipe connection comprising a box having tapered, internal, generally dovetail-shaped threads and a pin having tapered, external, generally dovetail-shaped threads that mate with the threads on the box when the connection is made up, a pipe thread lubricant coating the threads, said threads on the box and pin having stab flanks that are in engagement as the pin moves into the box due to relative rotation of the pin and box, roots and crests that move into engagement [when the connection is made up hand-tight] *during rotational make-up,* and load flanks that move into engagement [when the connection is fully made up] *upon rotational make-up of the threaded connection.*

3. A threaded pipe connection comprising a box having tapered, internal, generally dovetail-shaped threads with stab flanks and load flanks, and flat roots and crests that are parallel to the longitudinal axis of the pipe, and a pin having tapered, external, generally dovetail-shaped threads with stab flanks and load flanks, and flat roots and [rests] *crests* that are parallel to the longitudinal axis of the pipe, for mating with the internal threads of the box [tomade] *to make* up a threaded pipe connection, said threads increasing in width in one direction on the box and in the other direction on the pin so that [the stab flanks], the roots and crests *move into engagement during rotational makeup* and the [load] flanks of the threads [mave] *move* together [sequentially as] *when* the connection is *fully* made up, said roots and crests having sufficient width to prevent any permanent deformation of the threads [adjacent the roots and crests when the connection is made up].

4. In a threaded pipe connection including a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, said threads increasing in width in one direction on the box and in the other direction on the pin, and with at least the threads on one of the box and pin being coated with thread lubricant prior to make up the improvement to prevent the trapping of thread lubricant between the roots and crests causing an indication that the connector is made up before it is [,the improvement] comprising [,] the stab flanks and the roots and crests being designed to move into engagement when the pin and box are made up hand-tight *during rotational make-up of the connection* after which continued make up of the connection moves [the stab flanks, the roots and crests, and] the load flanks into [sealing] engagement [when] *upon rotational make-up of* the connection [is fully made up].

[5. In a threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, a pipe thread lubricant coating the threads, said threads increasing in width in one direction on the box and in the other direction on the pin the improvement comprising having the roots, crests, and flanks of the threads move together and form seals with the stab flanks moving together as the connection is being made up and the roots and crests being designed to move together when the pin and box are made up hand-tight after which continued make up of the connection moves the load flanks together completing the final make up of the connection thereby reducing substantially the volume of lubricant between the roots and crests when the connection is made up].

6. A threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a pipe joint, a pipe thread lubricant coating the threads, said threads increasing in width in one direction on the box and in the other direction on the pin so the roots, crests, and flanks of the threads move together and form seals that resist the flow of fluids between the threads with [the stab flanks and] the roots and crests being designed to move into [sealing] engagement before both the load flanks and the stab flanks move into [sealing] engagement [after which the flanks will move together and form seals] to complete the sealing of the connection as the connection is fully made up.

7. A threaded pipe connection comprising a box having tapered, internal, generally dovetail-shaped threads and a pin having tapered, external, generally dovetail-shaped threads that mate with the threads on the box when the connection is made up, a pipe thread lubricant coating the threads, said threads on the box and pin having stab flanks that are in engagement as the pin moves into the box due to relative rotation of the pin and box, roots and crests that move into engagement when the connection is made up hand-tight, and load flanks that move into engagement when the connection is fully made up, said roots and crests being flat wide surfaces so that, when engaged, the stress induced in the threads adjacent the [matin9] *mating* surfaces does not exceed the yield of the thread material.

*8. A threaded pipe connection comprising a box having tapered, internal, generally dovetail-shaped threads and a pin having tapered, external, generally dovetail-shaped threads that mate with the threads on the box when the connection is made up, a pipe thread lubricant coating the threads, said threads on the box and pin having stab flanks that are in engagement initially as the pin moves into the box and roots and crests that move into engagement after the stab flanks but before the load flanks move into engagement when the connection is fully made up.*

*9. In a threaded pipe connection including a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, said threads increasing the width in one direction on the box and in the other direction on the pin, and with at least the threads on one of the box and pin being coated with thread lubricant prior to make up, the improvement to prevent the trapping of thread lubricant between the roots and crests causing an indication that the connector is made up before it is, the improvement comprising, the roots and crests being designed to move into engagement before both the stab flanks and the load flanks move into engagement as the connection is fully made up.*

*10. In a threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, a pipe thread lubricant coating the threads, said threads increasing in width in one direction on the box and in the other direction on the pin the improvement comprising having the stab flanks and load flanks, but not both, in engagement at any one time before the roots and crests move into engagement during rotational make-up of the connection after which the other flanks move into engagement upon rotational make-up of the connection.*

*11. A threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a pipe connection, a pipe thread lubricant coating the threads, said threads increasing in width in one direction on the box and in the other direction on the pin so the roots, crests, and flanks of the threads move together and form seals that resist the flow of fluids between the threads with the roots and crests being designed to move into engage-*

*ment during rotational make-up before both the load flanks and the stab flanks move into engagement when the connection is fully made up.*

*12. A threaded pipe connection comprising a box having tapered, internal, generally dovetail-shaped threads and a pin having tapered, external, generally dovetail-shaped threads that mate with the threads on the box when the connection is made up, a pipe thread lubricant coating the threads, said dovetail-shaped threads on the box and pin providing stab flanks and load flanks only one set of which is in engagement at any given time as the pin moves into the box during rotational make-up of the pin and box and roots and crests that move into engagement during rotational make-up before the other set of flanks move into engagement upon rotational make-up of the connection.*

*13. A threaded pipe connection comprising a box having tapered, internal, generally dovetail-shaped threads with stab flanks and load flanks, and flat roots and crests that are parallel to the longitudinal axis of the pipe, and a pin having tapered, external, generally dovetail-shaped threads with stab flanks and load flanks, and flat roots and crests that are parallel to the longitudinal axis of the pipe, for mating with the internal threads of the box to make up a threaded pipe connection, a pipe thread lubricant coating the threads, said threads increasing in width in one direction on the box and in the other direction on the pin whereupon during rotational make up one or the other of the flanks, but not both may be in engagement at any given time prior to engagement of the roots and crests during rotational make-up and the remaining unengaged flanks of the threads moving together after the engagement of the roots and crests upon rotational make-up of the connection.*

*14. In a threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, a pipe thread lubricating coating the threads, said threads increasing in width in one direction on the box and in the other direction on the pin the improvement comprising having the roots, crests, and one of the flanks of the threads move together when the pin and box are made up hand-tight during rotational make-up of the connection after which continued rotational make-up of the connection moves the other flanks together upon rotational make-up of the connection thereby reducing substantially the volume of a lubricant between the roots and crests when the connection is made up.*

* * * * *